(12) United States Patent
Yamaguchi et al.

(10) Patent No.: US 6,412,723 B1
(45) Date of Patent: Jul. 2, 2002

(54) REEL FOR FISHING

(75) Inventors: Nobuyuki Yamaguchi, Tokyo; Shuichi Matsuzawa, Saitama; Masayoshi Fujii, Fukuoka; Shinichi Asano, Chiba, all of (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/482,264

(22) Filed: Jan. 13, 2000

(30) Foreign Application Priority Data

Jan. 13, 1999 (JP) .......................................... 11-006529
Jan. 13, 1999 (JP) .......................................... 11-006530

(51) Int. Cl.[7] .......................................... A01K 89/015
(52) U.S. Cl. .................. 242/322; 33/733; 116/299; 116/300; 116/335
(58) Field of Search ................. 242/912, 614, 242/322; 116/299, 335, 200, 280, 284, 300; 33/732, 733

(56) References Cited

U.S. PATENT DOCUMENTS

| 2,330,909 A | * | 10/1943 | Olson | 33/733 |
| 3,158,938 A | * | 12/1964 | Phillipps et al. | 33/733 |
| 3,785,055 A | * | 1/1974 | Anderson et al. | 33/733 |
| 4,893,414 A | * | 1/1990 | Samonek | 33/733 |
| 5,807,001 A | * | 9/1998 | Hammill et al. | 116/284 |
| 5,887,811 A | * | 3/1999 | Tsutumi | 242/322 |
| 6,056,218 A | * | 5/2000 | Nanbu | 33/732 |
| 6,092,297 A | * | 7/2000 | Simon | 33/733 |

FOREIGN PATENT DOCUMENTS

| JP | 57-86572 | 11/1955 |
| JP | 60-41164 | 3/1985 |

* cited by examiner

Primary Examiner—Emmanuel M. Marcelo
(74) Attorney, Agent, or Firm—Liniak, Berenato, Longacre & White (57) ABSTRACT

A spool shaft 2 supported between reel side-plates 3 and 4 and a spool 1 secured to the spool shaft 2 in a double bearing reel for fishing are integrally formed of the same material.

2 Claims, 8 Drawing Sheets

REEL FOR FISHING

BACKGROUND OF THE INVENTION

1. Field of the Invention

This invention relates to improvements in the spool portion of a reel for fishing, in particular, a double bearing reel for fishing.

2. Description of the Related Art

Spool portions of double bearing reels for fishing are, as disclosed in Japanese Utility Model Unexamined Publication No.Sho.57-86572 and Japanese Utility Model Unexamined Publication No.Sho.60-41164, usually fabricated by press-fitting, pinning or insert-molding corrosion resisting spool shafts of high strength metal such as stainless or titanium into the central portions of spools now.

However, the aforementioned related art method of forming the spool portion with the spool and the spool shaft passed through the spool still presents some problems including an increase in the weight of the spool portion, and variations in concentric accuracy between the spool and the spool shaft because it is difficult to maintain such concentric accuracy. Consequently, the outer peripheral edge portion of the fishline winding portion of the spool may come in contact with the very small gap portion of the cover of reel side-plates, thus hampering the fishline casting operation, and the noise produced during the high-speed rotation may also restrain a smooth fishing operation. Moreover, the complicated construction as well as the troublesome assembly work required will result in an increase in costs.

SUMMARY OF THE INVENTION

An object of the invention intended to solve the foregoing problems is to provide a double bearing reel for fishing having a spool portion which is lightweight, and precise and simple in construction and allowing a fishing operation to be performed smoothly with agility.

In order to accomplish the object above, there is provided a double bearing reel for fishing wherein a spool shaft supported between reel side-plates and a spool are integrally formed of the same material. Both end portions of the spool shaft are rotatably supported by the respective reel side-plates. In this case, however, one end portion of the spool shaft may be rotatably supported via a pivot shaft which is projected from and fixed to the reel side-plate. The spool shaft on the side of the reel side-plate having a spool driving mechanism may be provided with an engaging portion disengageable from a pinion in the spool driving mechanism. The end portion of the spool shaft may be passed through the pinion and extended up to abutting against the reel side-plate. Moreover, an abrasion resistant members for regulating the axial direction of the spool shaft may be provided in one end portion or both end portions of the spool shaft.

In case where the spool is formed of material such as aluminum utilizable for a magnetic annular body, the fishline winding portion of the spool and the magnetic annular body of a magnetic brake unit may be integrally formed of the same material on the outer side of the fishline winding portion thereof.

DETAILED DESCRIPTION OF THE PREFERRED EMBODIMENTS

Figure 1:
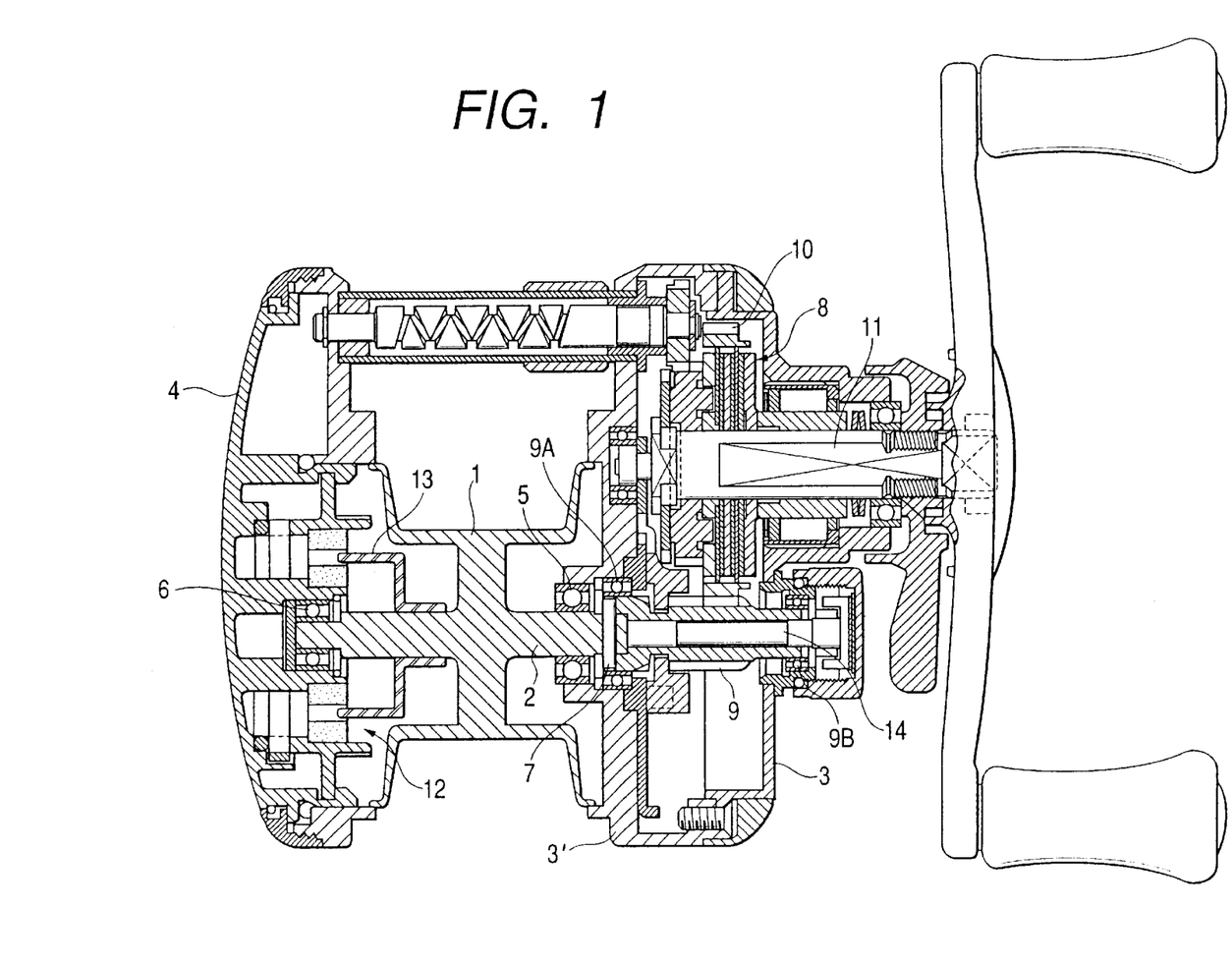
FIG. 1 is a longitudinal section front view according to a first embodiment of the present invention.
Figure 2:
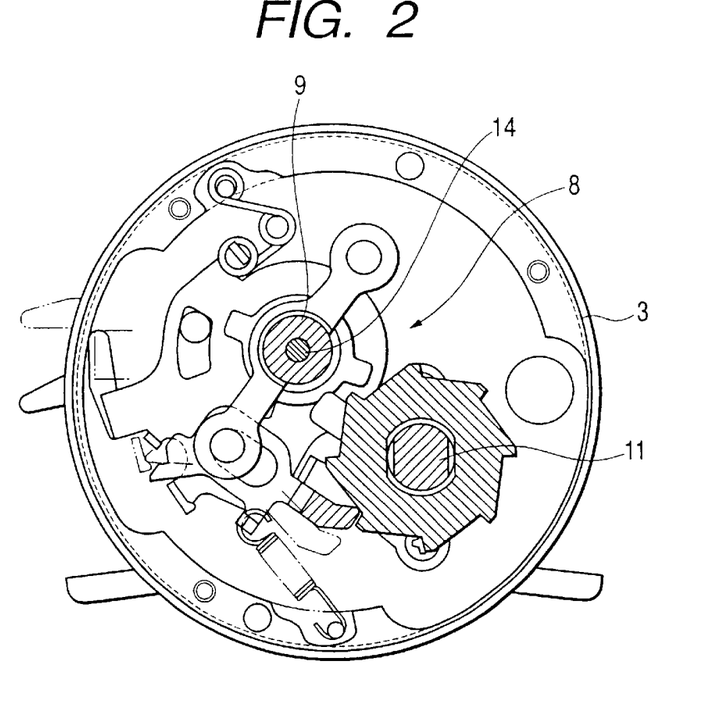
FIG. 2 is a longitudinal section side view thereof.
Figure 3:
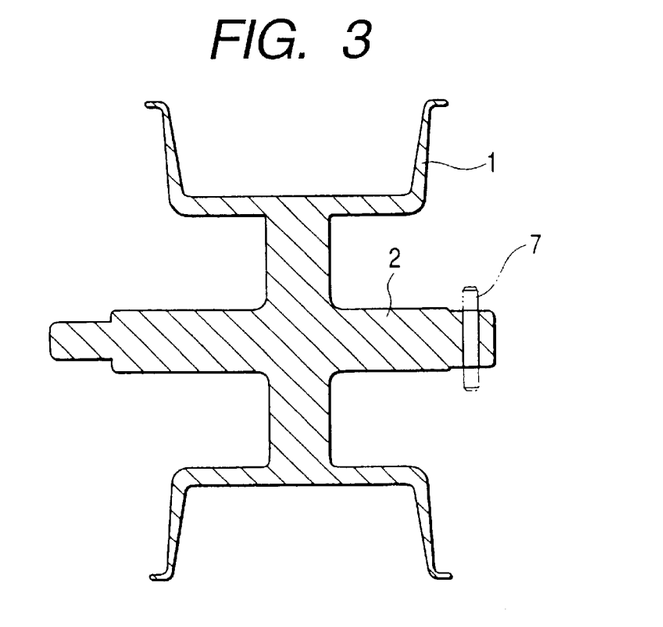
FIG. 3 is a sectional view of a spool portion thereof.

The preferred embodiments of the present invention will now be described with reference to the drawings. A double bearing reel for fishing according to the invention includes a spool 1 that is made of lightweight material such as aluminum, magnesium or synthetic resin and has a spool shaft 2 that is made of the same material as that of the reel and formed integrally with the central portion of the spool. Both the end portions of the spool shaft 2 are rotatably supported by the frame 3' of a reel side-plate 3 and a reel side-plate 4 via bearings 5 and 6, respectively. An engaging portion 7 provided in the end portion on the side of the reel side-plate 3 is formed disengageable with the engaging portion of a pinion 9 through a clutch operation with a spool driving mechanism 8 installed on the reel side-plate 3. Consequently, a fishline can be wound on the spool 1 via the spool shaft 2 by rotating a handle shaft 11 having a drive gear 10 engaging with the pinion 9, when the pinion 9 is engaged with the engaging portion 7. Further, the spool shaft 2 on the side of the reel side-plate 4 is provided with a magnetic annular body 13 for a magnetic brake unit 12. In FIG. 1, reference numeral 14 denotes a direction-regulating support shaft for the spool shaft 2 that is fitted into the pinion 9 rotatably and axially movably supported by bearings 9A and 9B within the reel side-plate 3.

Accordingly, since the spool as the spool portion for winding the fishline and the spool shaft rotatably supported by both the side plates in the double bearing reel for fishing are integrally formed of the same material, highly concentric accuracy can be maintained between the fishline winding portion of the spool and the spool shaft while an attempt at decreasing the weight of the spool portion is planned. The fishing operation, the casting operation in particular, is made improvable by preventing the peripheral edge of the fishline-winding spool portion from coming in contact with the reel side-plate. Moreover, the spool portion that is simple in construction makes the assembly work easier, which will also result in a decrease in manufacturing costs.

Figure 4:
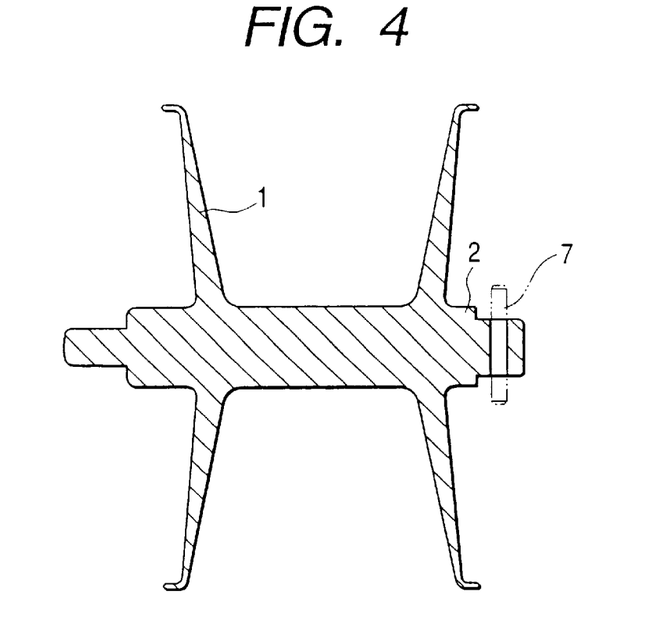
FIG. 4 is a sectional view of a spool portion according to a second embodiment of the invention.

A second embodiment of the invention shown in FIG. 4 is intended to increase a quantity of fishline to be wound on the fishline winding portion of the spool 1 according to the first embodiment of the invention by making the diameter of the fishline winding portion thereof substantially equal to the diameter of the spool shaft 2.

Figure 5:
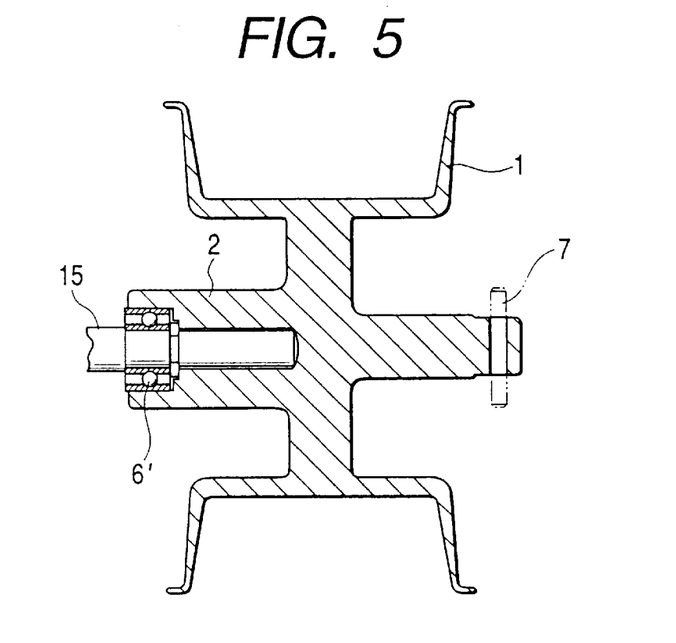
FIG. 5 is a sectional view of a spool portion according to a third embodiment of the invention.

FIG. 5 shows a third embodiment of the invention, wherein the end portion of the shaft 2 on the side of reel side-plate 4 according to the first embodiment is rotatably supported via a bearing 6' to a pivot shaft 15 that is projected from and fixed to the reel side-plate 4.

Figure 6:
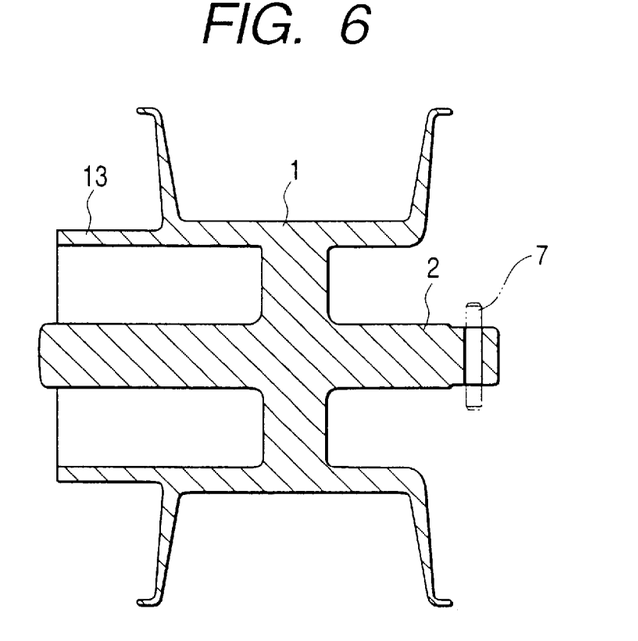
FIG. 6 is a sectional view of a spool portion according to a fourth embodiment of the invention.

FIG. 6 shows a fourth embodiment of the invention, wherein the magnetic annular body 13 of the magnetic brake unit 12 and the spool 1 according to the first embodiment are integrally formed of the same material. Thus, when the spool is formed of the same material as that of the magnetic annular body of the magnetic brake unit such as aluminum, it is possible to simplify the construction and assembly work of the spool further by integrally forming the spool and the magnetic annular body.

Figure 7:
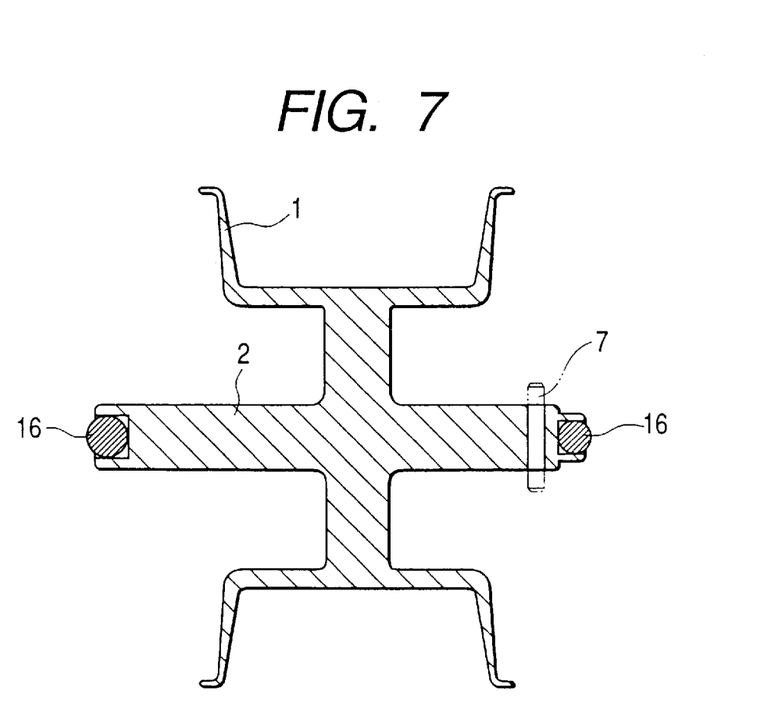
FIG. 7 is a sectional view of a spool portion according to a fifth embodiment of the invention.

Further, FIG. 7 shows a fifth embodiment of the invention, wherein ball-shaped abrasion resistant members 16 for regulating the axial direction of the spool shaft 2, which members are made of stainless steel, ceramic or abrasion resistant plastic material, are fitted into both end portions of the spool shaft 2, respectively. Accordingly, provision of the abrasion resistant member for regulating the axial direction of the spool shaft in both the end portions of the spool shaft ensures the smooth fishing operation without impeding the brake action in the direction of the spool shaft while an attempt at decreasing the weight of the spool portion is deliberated.

Figure 8:
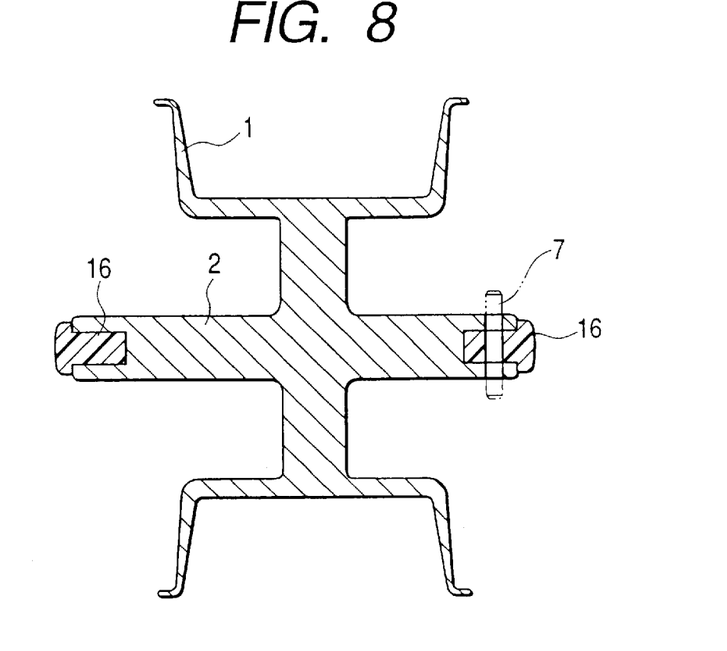
FIG. 8 is a sectional view of a spool portion according to a sixth embodiment of the invention.
Figure 9:
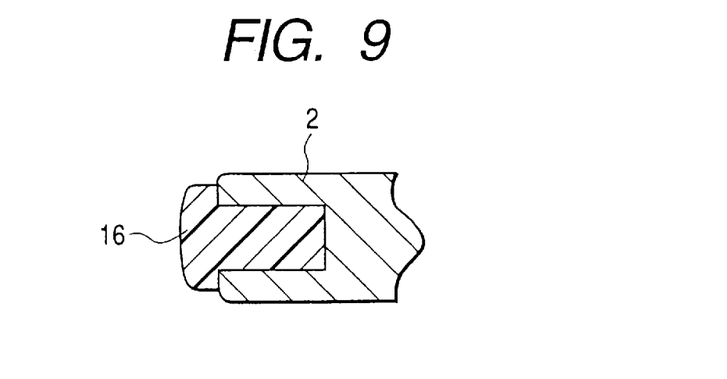
FIG. 9 is an enlarged sectional view of the principal part of FIG. 8.

FIGS. 8 and 9 show a sixth embodiment of the invention, wherein pin-shaped, instead of the ball-shaped according to the preceding embodiment, abrasion resistant members 16 are provided.

Figure 10:
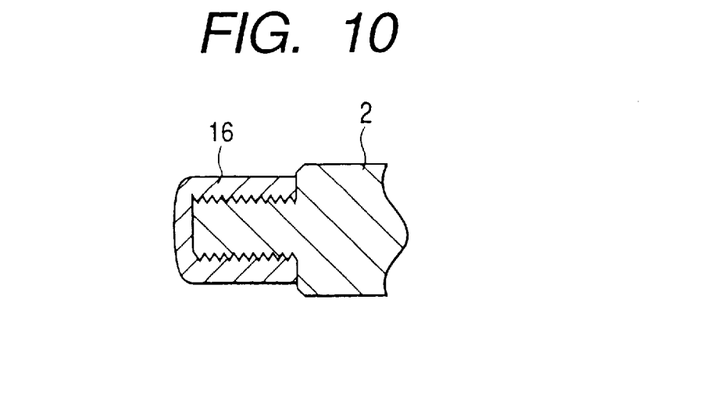
FIG. 10 is an enlarged sectional view of the principal part according to a seventh embodiment of the invention.

FIG. 10 shows a seventh embodiment of the invention, wherein abrasion resistant members 16 in the form of caps are screwed onto the spool shaft 2.

Figure 11:
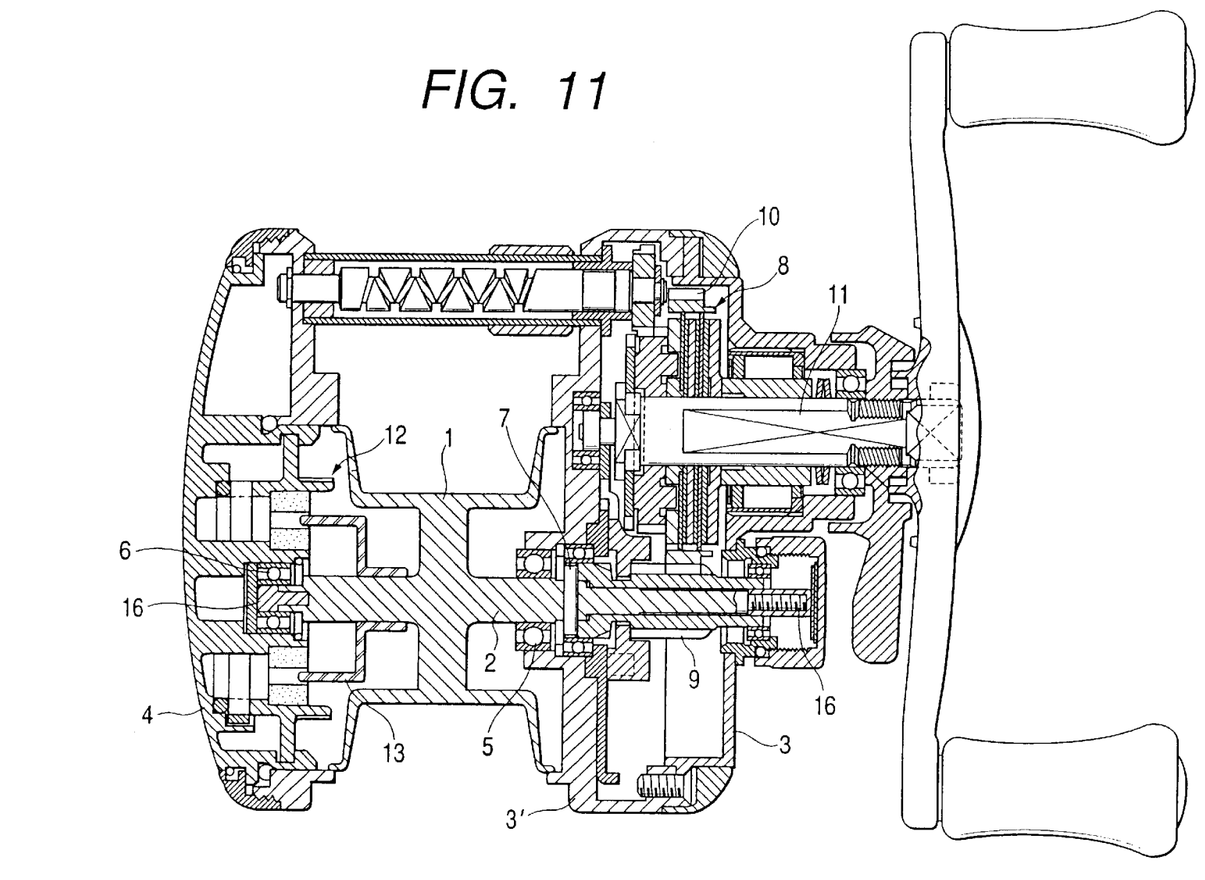
FIG. 11 is a longitudinal section front view of an eighth embodiment of the invention.

FIG. 11 shows an eighth embodiment of the invention, wherein the spool shaft 2 on the side of the reel side-plate 3 according to the first embodiment is passed through the pinion 9 and extended up to abutting against the outer side portion of the reel side-plate 3 whose one end portion is provided with a pin-shaped abrasion resistant member 16, the other end portion being provided with a cap-shaped abrasion resistant member 16.

Figure 12A:
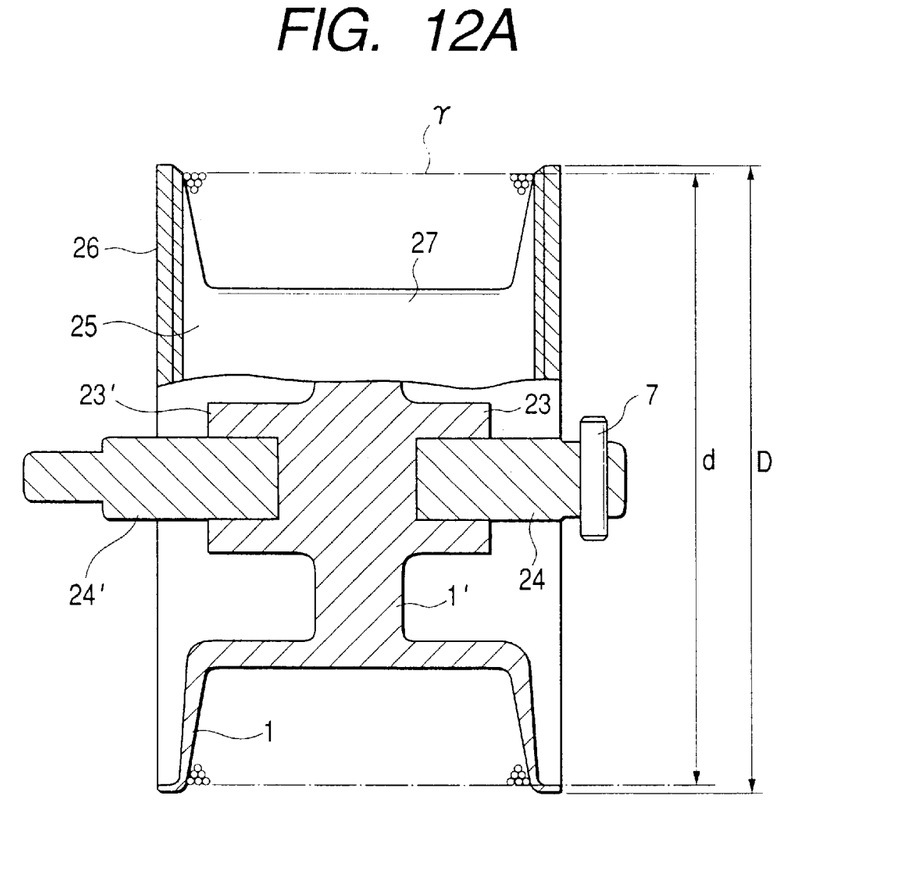
FIG. 12A is a sectional view of a spool portion according to a ninth embodiment of the invention.
Figure 12B:
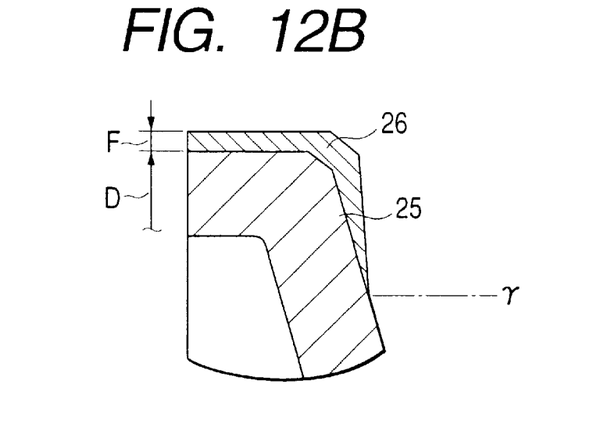
FIG. 12B is an enlarged sectional view of a flange portion of the spool according to the ninth embodiment of the invention.
Figure 13:
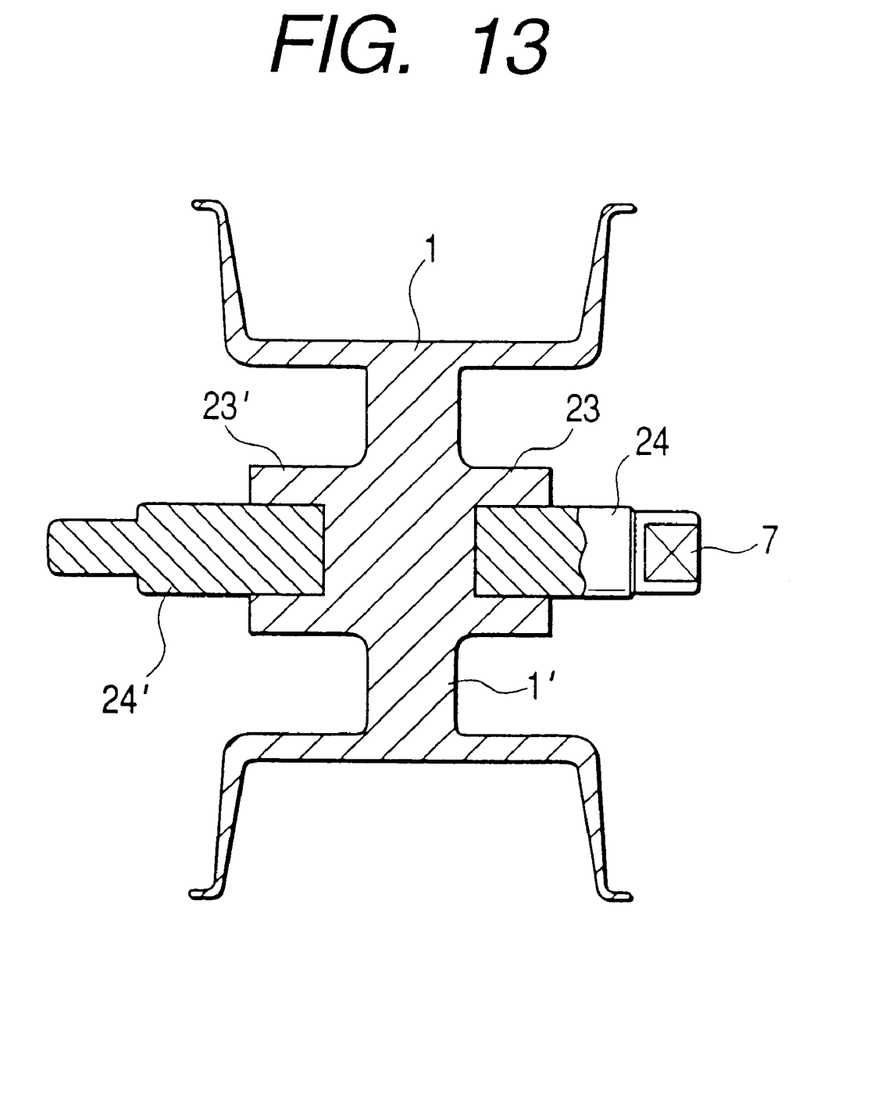
FIG. 13 is a sectional view of a spool portion according to a modification of the ninth embodiment of the invention.

In FIGS. 12A to 13 showing a ninth embodiment of the invention, a spool 1 is made of lightweight material such as aluminum, magnesium or synthetic resin, and in the center portion of the spool 1, there is provided bosses 23, 23' integrally formed in both sides of a base portion 1' so that center lines of the bosses 23, 23' are coaxially located. Shafts 24, 24', which are made of metal material of high strength and corrosion resistance such as titanium and stainless steel material are respectively fixed to the bosses 23, 23' in such a manner as to project outwardly from the bosses 23, 23'.

Of the shafts 24 and 24', the shaft 24 projected toward the side of the reel side-plate 3 having the spool driving mechanism 8 is supported by a frame of the reel side-plate 6 and also provided with an engaging portion 7 with which the pinion 9 of the spool driving mechanism 8 is engaged. On the other hand, the other shaft 24' is rotatably supported by a reel side-plate 4, so that the spool 1 is, as is already known, made rotatable by the spool driving mechanism 8 and a clutch mechanism via the pinion that is disengageable from the shaft 24 when a handle is rotated. FIG. 13 is a modification of FIG. 12A, wherein an engaging portion 7' is formed in an oval shape being a non-circular shape in the cross section, instead of the engaging portion 7.

Accordingly, the spool shaft that is rotatable integrally with the spool is separately projected on the same longitudinal axis from the opposed sides of the central portion of the spool, and only the shaft needed to rotate the spool is formed of high strength material. Thus, the weight of the spool shaft portion is decreased while the spool supporting function of the spool shaft is thus certainly maintained. Further, it is possible to perform the operation of casting the reel smoothly with agility including casting fishing tackles precisely toward a target point and repeating the casting operation for hours.

Further, as shown in FIG. 12A, the pair of flange portions 25 of the spool 1 are specifically colored differently whereby to vary the tone color. As shown in FIG. 12A and 12B particularly in detail, the specifically colored sections 26 of the pair of flange portions 25 correspond to the respective extended end sections of the pair of flange portions 25, and the boundary between the specifically colored section 26 and any other section corresponds to the boundary $\gamma$ of the winding body portion 27 of the fishline on which the predetermined quantity of fishline has been wound.

The specifically colored section 26 is different in color from any other section which may be non-colored or otherwise colored differently from the specifically colored section 26.

The colored section 26 may exist in at least only one section of the pair of flange portions 25. Moreover, a known coloring method most suitable for the material of a section to be colored in the spool 1 may be employed for the colored section 26. Such a known coloring method includes, for example, a plating, oxidized film forming, a physical vapor deposition (PVD) method such as ion-plating, deposition or sputtering method, a chemical vapor deposition (CVD) method, and a thermal spraying method, to say nothing of a paint applying, printing or hot stamping method.

When the material of a section to be colored in the spool 1 is, for example, (1) aluminum, or aluminum alloy mainly containing aluminum, the oxidized film forming through anodized aluminum processing, paint applying, printing, hot stamping or ion-plating method has been known to be fit for use;

(2) in the case of stainless alloy, the paint applying, printing, hot stamping after printing or ion-plating method has been known to be fit for use; and (3) in the case of synthetic resin, the paint applying, printing or hot stamping method has also been known to be fit for use.

Normally, the outer diameter d of the boundary $\gamma$ of the section of the fishline would be a predetermined maximum quantity on the outer peripheral face of the winding body portion 27 of the spool 1 relative to the outer diameter D of the pair of flange portions 25 of the spool 1 is ideally set to satisfy substantially $90 < d/D <$ approximately 100 as a maximum limit. In addition, the colored section 26 increases in the outer diameter D of the pair of flange portions 25 as shown in FIG. 12B in detail. This increased thickness F of the flange portion 25 is substantially $2\ \mu m - 14\ \mu m$.

With the flange portions of the spool thus structured, since the flange portion is formed into sections having color tones radially different between the sections outside and inside a boundary with a predetermined quantity of fishline to be wound on the spool as the boundary without forming the grooves in the flange portion like the conventional spool. Therefore, since the invention does not require to increase the thickness of the flange portion in the grooves, no increase in weight is required to reinforce the strength of the spool, which makes the spool lightweight and allows the delicate operation of the spool and in turn effectively suppresses the generation of so-called backlash of the fishline. Moreover, the manufacture of spools is also facilitated according as the grooves are not formed.

Unlike the grooves and gradation in the conventional spool, the coloring of the flange portions makes the length of the wound fishline on the winding barrel portion of the spool and the length of played-out fishline from the winding body portion thereof clear at a glance even during the rotating or stationary condition of the spool.

While only certain embodiments of the invention have been specifically described herein, it will apparent that numerous modification may be made thereto without departing from the spirit and scope of the invention.

What is claimed is:

1. A reel for fishing comprising:

a reel main body; and a spool supported to said reel main body, said spool including a winding barrel portion for winding a fishline thereon at least one flange portion radially projecting outward from both side portions of said winding barrel portion;

wherein said at least one flange portion defines a boundary in a radial direction from said winding barrel portion thereof, and said at least one flange portion has color tones different between the sections outside and inside said boundary in said radial direction;

wherein said boundary indicates a predetermined target maximum quantity of said fishline to be wound on the spool by an angler during rotation of said spool.

2. A reel for fishing comprising:

a reel main body; and a spool supported to said reel main body, said spool including a winding barrel portion for winding a fishline thereon at least one flange portion radially projecting outward from both side portions of said winding barrel portion;

wherein said at least one flange portion defines a boundary in a radial direction from said winding barrel portion thereof, and said at least one flange portion has color tones different between the sections outside and inside said boundary in said radial direction;

wherein at least one side portion disposed along said winding barrel portion has different color tones extending from said at least one flange portion to said boundary thereby providing a variable boundary;

said color tones on said at least one flange portion have a thickness in a range of 2 $\mu$m to 14 $\mu$m.

* * * * *